(12) United States Patent
Das et al.

(10) Patent No.: US 9,921,945 B2
(45) Date of Patent: Mar. 20, 2018

(54) AUTOMATIC VERIFICATION OF JSON DATA

(71) Applicant: ADP, LLC, Roseland, NJ (US)

(72) Inventors: Tista Das, Somerset, NJ (US); Sachin V. Havaldar, Madison, NJ (US); Laiyuan Liu, Livingston, NJ (US)

(73) Assignee: ADP, LLC, Roseland, NJ (US)

(*) Notice: Subject to any disclaimer, the term of this patent is extended or adjusted under 35 U.S.C. 154(b) by 379 days.

(21) Appl. No.: 14/679,281

(22) Filed: Apr. 6, 2015

(65) Prior Publication Data

US 2016/0292242 A1    Oct. 6, 2016

(51) Int. Cl.
G06F 17/30    (2006.01)
G06F 11/36    (2006.01)

(52) U.S. Cl.
CPC ............... G06F 11/3668 (2013.01)

(58) Field of Classification Search
CPC .................................. G06F 11/3668
See application file for complete search history.

(56) References Cited

U.S. PATENT DOCUMENTS

| 7,490,319 B2 | 2/2009 | Blackwell et al. | |
| 2010/0211572 A1* | 8/2010 | Beyer | G06F 17/30864 707/742 |
| 2012/0174075 A1* | 7/2012 | Carteri | G06F 11/3688 717/127 |
| 2013/0086100 A1* | 4/2013 | de Cerqueira Gatti | G06F 17/3092 707/769 |
| 2013/0326491 A1 | 12/2013 | Caira et al. | |
| 2014/0067866 A1* | 3/2014 | Chen | G06F 17/3089 707/791 |
| 2014/0279837 A1 | 9/2014 | Guo et al. | |

(Continued)

FOREIGN PATENT DOCUMENTS

| CN | 101101602 A | 1/2008 |
| CN | 102479130 A | 5/2012 |

OTHER PUBLICATIONS

Nurzhan Nurseitov et al, Comparison of JSON and XML Data Interchange Formats: A Case Study, Montana State University, 2009.

(Continued)

*Primary Examiner* — Apu Mofiz
*Assistant Examiner* — Jared Bibbee
(74) *Attorney, Agent, or Firm* — Patrick J. Daugherty; Driggs, Hogg, Daugherty & Del Zoppo Co., LPA (57) ABSTRACT

Aspects provide for automatic verification of JavaScript Object Notation (JSON) data by making a JSON call via an Extensible Markup Language (XML) Hypertext Transfer Protocol (HTTP) HTTP object against a data warehouse data item stored in a back end server. JSON response data returned from the back end server in response to the JSON call is converted into actual XML result data that includes a first plurality of XML statements. A Structured Query Language (SQL) query is executed against the data warehouse data item, and expected XML result data generated in response thereto that include a different (second) plurality of XML statements. The JSON response data returned from the back end server is thereby verified in response to matching the actual XML result data to the expected XML result data.

17 Claims, 5 Drawing Sheets

(56) References Cited

U.S. PATENT DOCUMENTS

| | | | | |
|---|---|---|---|---|
| 2015/0046389 A1* | 2/2015 | Dhayapule | ........ | G06F 17/30563 |
| | | | | 707/602 |
| 2015/0089470 A1* | 3/2015 | Shakespeare | ........... | G06F 8/315 |
| | | | | 717/108 |
| 2015/0341176 A1* | 11/2015 | Staykov | ................ | H04L 9/3247 |
| | | | | 713/176 |

OTHER PUBLICATIONS

David Lee, JXON: an Architecture for Schema and Annotation Driven JSON/XML Bidirectional Transformations, Balisage: The Markup Conference, 2011.

\* cited by examiner

FIG 1

Table 2

```
<?xml version="1.0"?>
<root>
    <chartTypeCodeValue>COLUMN</chartTypeCodeValue>
    <metricTimeCode>
        <codeValue>Current Quarter</codeValue>
        <shortName>Current Quarter</shortName>
    </metricTimeCode>
    <metricValues>
        <columns>
            <columnName>Period</columnName>
            <columnDataType>String</columnDataType>
        </columns>
        <columns>
            <columnName>Code</columnName>
            <columnDataType>String</columnDataType>
        </columns>
        <columns>
            <columnName>Job</columnName>
            <columnDataType>String</columnDataType>
        </columns>
        <columns>
            <columnName>Total Headcounts</columnName>
            <columnDataType>Number</columnDataType>
        </columns>
        <rows>
            <rows>Q1-2014</rows>
            <rows>3</rows>
            <rows>Professnls</rows>
            <rows>1246</rows>
```

AUTOMATIC VERIFICATION OF JSON DATA

BACKGROUND

A data warehouse is a relational database that is designed for query and analysis rather than for transaction processing. It usually contains historical data derived from transaction data, but it can include data from other sources. It may separate analysis workload from transaction workload and enable an organization to consolidate data from several sources. In addition to a relational database, a data warehouse environment generally includes back end extraction, transportation, transformation, and loading (ETL) solutions, online analytical processing (OLAP) engines, client analysis tools, and other applications that manage the process of gathering data and delivering it to business users.

Front-end and back-end are terms which refer to the separation of concerns between a presentation layer and a data access layer, respectively, and wherein the data warehouse resides in the back end. The front end is an interface between the user and the back end. The front end is an abstraction layer that simplifies an underlying component by providing a user-friendly interface. Back end code typically resides on a data warehouse server, wherein a back-end application or program serves indirectly in support of the front-end services, to provide access to the data warehouse.

Front end abstraction layers may utilize a variety of different programming language and environment approaches in engaging the back end, and examples include Extensible Markup Language (XML), JavaScript Object Notation (JSON) and Structured Query Language (SQL) environments. XML is a markup language that defines a set of rules for encoding documents presented in the front end in a format which is both human-readable and machine-readable. XML is a textual data format with strong support via unicode for different human languages. Although the design of XML focuses on documents, it is widely used for the representation of arbitrary data structures such as those used in web services. Several schema systems exist to aid in the definition of XML-based languages, while many application programming interfaces (APIs) have been developed to aid the processing of XML data.

JavaScript Object Notation (JSON) is a language-independent data format that uses human-readable text to transmit data objects consisting of attribute-value pairs. It is often used to transmit data between a server and a web application, including as an alternative to XML.

Structured Query Language (SQL) is a special-purpose programming language generally designed for managing data held in a relational database management system (RDBMS), or for stream processing in a relational data stream management system (RDSMS), and consists of a data definition language and a data manipulation language.

BRIEF SUMMARY

In one aspect of the present invention, a method for automatic verification of JavaScript Object Notation (JSON) data includes executing on a processor steps that include making a JSON call via an Extensible Markup Language (XML) Hypertext Transfer Protocol (HTTP) HTTP object against a data warehouse data item stored in a back end server. JSON response data returned from the back end server in response to the JSON call is converted into actual XML result data that includes a first plurality of XML statements. A Structured Query Language (SQL) query is executed against the data warehouse data item, and expected XML result data generated in response thereto that include a different (second) plurality of XML statements. The JSON response data returned from the back end server is thereby verified in response to matching the actual XML result data to the expected XML result data.

In another aspect, a system has a hardware processor in circuit communication with a computer readable memory and a computer-readable storage medium having program instructions stored thereon. The processor executes the program instructions stored on the computer-readable storage medium via the computer readable memory and thereby makes a JSON call via an Extensible Markup Language (XML) Hypertext Transfer Protocol (HTTP) HTTP object against a data warehouse data item stored in a back end server. JSON response data returned from the back end server in response to the JSON call is converted into actual XML result data that includes a first plurality of XML statements. A Structured Query Language (SQL) query is executed against the data warehouse data item, and expected XML result data generated in response thereto that include a different (second) plurality of XML statements. The JSON response data returned from the back end server is thereby verified in response to matching the actual XML result data to the expected XML result data.

In another aspect, a computer program product for automatic verification of JavaScript Object Notation (JSON) data has a computer-readable storage medium (hardware storage device) with computer readable program code embodied therewith. The computer readable program code includes instructions for execution that cause the processor to make a JSON call via an Extensible Markup Language (XML) Hypertext Transfer Protocol (HTTP) HTTP object against a data warehouse data item stored in a back end server. JSON response data returned from the back end server in response to the JSON call is converted into actual XML result data that includes a first plurality of XML statements. A Structured Query Language (SQL) query is executed against the data warehouse data item, and expected XML result data generated in response thereto that include a different (second) plurality of XML statements. The JSON response data returned from the back end server is thereby verified in response to matching the actual XML result data to the expected XML result data.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Prior art verification of JSON data generated in front end processes from back end data warehouse sources generally requires a manual review of the output data, wherein samples of the generated JSON data are read, examined or otherwise audited in a time-consuming process. Such efforts are generally incomplete as well, as it is generally impractical to cover all the problem and error scenarios that can possibly be presented in the front end via manual review. In contrast, aspects of the present invention use an automated validation process to validate JSON data called from back end data by comparison to other data results generated from SQL queries.

Figure 1:
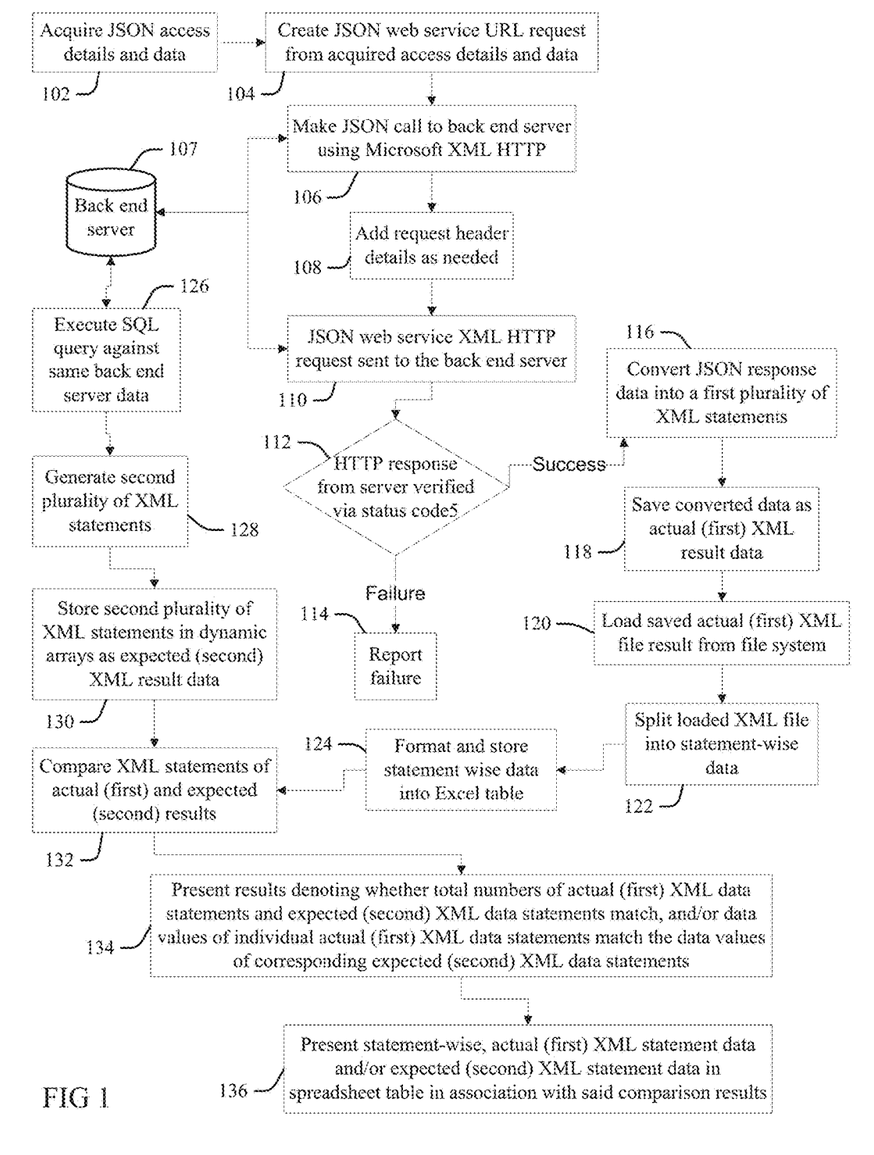
FIG. 1 is a flow chart illustration of a method or process aspect according to the present invention for automatic verification of JSON data.

FIG. 1 illustrates a method for automatic verification of JSON data according to the present invention. At 102 JSON access details and data are acquired relative to a back end server data warehouse data source. At 104 a JSON web service URL request is created from the acquired access details and data.

At 106 a JSON web service uses the created URL request to make a JSON call to a back end server 107 against data warehouse data stored in the back end server. In some examples, the JSON call is made using Microsoft XML HTTP, which implements an XML HTTP object that has functionality enabling the exchange of Extensible Markup Language (XML) data directly over the Internet using the Hypertext Transfer Protocol (HTTP). The XML HTTP object enables access of the back end data warehouse data from a Web server, parsing the data using an XML Document Object Model (DOM), as well as posting XML data through a typical firewall directly to an HTTP server.

At 108 request header details are added as needed, and the JSON web service XML HTTP request is sent to the back end server at 110. Table 1 provides one illustrative but not exhaustive example of an HTTP response returned from the server in response to the request at 110:

Table 1

{"chartTypeCodeValue":"COLUMN","metricTime-
Code":{"codeValue":"Current Quarter","shortName":
"Current Quarter"}, "metricValues": {"columns":
[{"columnName":"Period","columnDataType":
"String"},{"columnName":"Code","column-
DataType":"String"},{"columnName":"Job","column-
DataType":"String"},{"columnName":"Total
Headcounts", "columnDataType":"Number"}],"rows":
[["Q1-2014", "3", "Professnls", 1246],["Q1-2014",
"2","First/Mid",1077],["Q1-2014","6","Admin Supp",
543],["Q1-2014","5","Sales Wrkr",180],["Q1-2014",
"4", "Technician", 151], ["Q1-2014","10","Servc
Wrkr",105],["Q1-2014","1","Exec/Sr",96],["Q1-
2014","N", "No EEO-1",13]]},"dataFormat":"NU-
MERIC","drillDwnFilter": "p_pjobfunction", "yaxis-
Title":"Head Counts","dimension":1,"dataIndex":2}}

At 112 the HTTP response from the server is verified as a function of a status code sent with the response. The verification at 112 looks for a success status code, such as "code 200". Other returned codes that do not indicate a success (for example, "no content 204", "not found 404", "internal server error 500", and still others will be apparent to one skilled in the art) indicate a failure at 112, which is reported out at 114.

If the verification at 112 confirms success, then at 116 the JSON response data is converted to a first plurality of XML statements. Some aspects use "Newtonsoft.Json.dll," created by James Newton-King for the conversion at 116, though other processes may be practiced.

Figure 2:
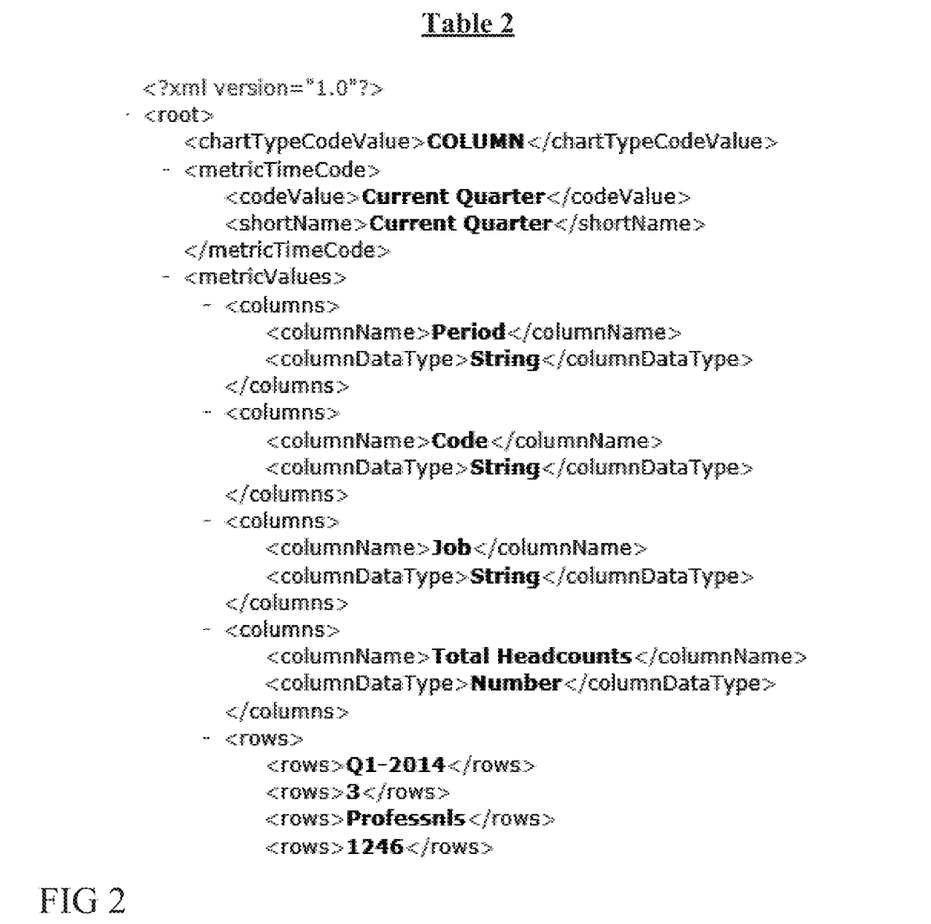
FIG. 2 is a tabular illustration of a conversion of JSON response data to XML statements according to the present invention.

Table 2 of FIG. 2 is a tabular illustration of an illustrative but not exhaustive example of a conversion of the JSON response data of Table 1 to a plurality of XML statements. The XML statements of the converted data are saved at 118 as actual XML result data. (The actual result data is sometimes designated herein as the "first" XML result data in order to distinguish this data from other XML data discussed herein, and still other labels may be used.)

At 120 the saved actual (first) XML file result data is loaded from the file system, split into statement-wise data at 122, and formatted into a spreadsheet database format and stored into an actual XML result database file suitable for display in a spreadsheet table at 124.

In a parallel, independent path, at 126 a Structured Query Language (SQL) query is executed against the same back end data warehouse data that is subject to the JSON request at 110. This results in generating a second plurality of XML statements at 128 from the data warehouse data in response to the executed SQL query, which are stored in dynamic arrays as expected (second) XML results at 130, and wherein the dynamic arrays are formatted for display in a spreadsheet table. (The "expected XML result" is also designated herein as the "second XML result", and still other labels may be used to differentiate the expected/second result from the actual/first result data saved at 118.)

Aspects of the present invention verify the JSON response data returned from the back end server in response to (as a function of) matching of the actual XML result data to the expected XML result data. In the present example, at 132 total numbers and values of the XML statements of actual XML file result (first result) first plurality of XML statements converted from the JSON response data are compared to the total numbers and values of the second plurality of XML statements of the expected XML result file (second result) generated for the SQL statements. At 134 the results of the comparison are presented by denoting at least one of whether total numbers of actual (first) XML data statements match the total number of the expected (second) XML data statements, and whether data values of individual actual (first) XML data statements match the data values of corresponding expected (second) XML data statements.

In some aspects, the results presented at 134 denote whether the total number of the actual (first) XML data statements generated by converting the JSON script result for each data warehouse data item matches the total number of the expected (second) XML data statements generated by a corresponding SQL query to that same data warehouse data item. The comparison results presented at 134 also denote whether each of the individual actual (first) XML data statements match corresponding ones of the individual expected (second) XML data statements generated for the same data warehouse data item.

In some examples, the presentment also includes at 136 presenting at least one of the statement-wise, actual (first) XML statement data and the expected (second) XML statement data (for example, in different sheets) within a spreadsheet table (at 124) in association with said comparison results.

In some aspects, a Hewlett Packard (HP) Unified Functional Testing tool (UFT) is used to compare the actual to the expected XML file results at 132 and report the results of the comparison at 134, though other processes and systems may be used to perform these steps, as will be appreciated by one skilled in the art. FIGS. 3 through 7 illustrate examples of presentations of test results generated by the UFT tool within graphical user interface displays (GUI) that each include three windows, namely:

(i) A result window 202 that displays the results of the comparison of the actual XML data generated from the JSON conversion of the back end data to the expected XML data generated from the SQL query. The result window 202 indicates the success or failure of matching each JSON script to each SQL query, as well as in matching their respective pluralities of generated XMLs, thus at a granularity of each compared XML statement;

(ii) different ones of detail or informational windows 204, 208, 210, 212 or 213 that are each triggered or generated in response to selections of different items presented within the comparison window 202; and (iii) a spreadsheet window 206 that presents in a spreadsheet table (for example, in an Excel table) two sheets that are selected via their respective tabs 207 and 209, one comprising the statement-wise actual XML data generated from the JSON data and formatted at 124, and the other comprising the expected (second) XML statement dynamic array data stored at 130. The spreadsheet sheets may comprise the data from all of their respective actual and expected XML statements, or it may be limited or default to XML statements that are relevant to selections within the result window 202 and/or the detail/informational windows 204, 208, 210, 212 or 213.

Figure 3:
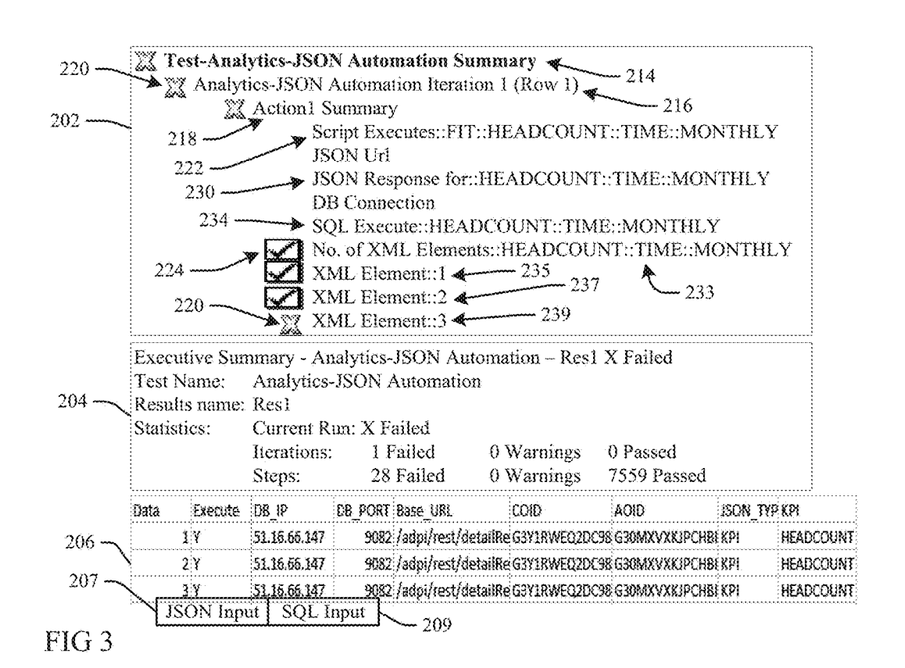
FIG. 3 is a graphic illustration of a presentation of a verification of JSON data according to the present invention.

Referring to FIG. 3, the results window 202 displays a title 214 of the overall test result ("Test-Analytics-JSON Automation Summary"), identifies iteration and data location information 216 ("Analytics-JSON Automation Iteration 1 (Row 1)" and action information 218 ("Action1 Summary"), each of which are listed with an "X" marker 220 which denotes to a viewer that a comparison of the XML statements of actual XML file result (first result) converted from the JSON response data to the XML statements of the expected XML result file (second result) generated from the SQL statements has found a match or other comparison failure. The mismatch indicators 220 indicate discrepancies between the actual and expected (first and second) XML statement result files, which may be used to identify data errors in the back end or process errors in the front end.

The results window 202 displays JSON script elements and corresponding SQL queries for each of the back end data warehouse data items, for example in a scroll bar window configuration. In the present view, the results window 202 indicates at 222 that a JSON call was executed against a back end data warehouse item entitled "HEADCOUNT::TIME::MONTHLY," which resulted in a JSON response (as indicated at 230), and that an SQL query was also executed against the "HEADCOUNT::TIME::MONTHLY" item (as indicated at 234). In order to simplify presentation in the figures, only a portion of the content is graphically depicted in window 202, and it will be understood that the results window 202 also comprehends actual and expected XML result comparison data for other data warehouse data items (not shown).

The results of comparisons of their respective XML statements are listed immediately below. Thus, the "check" marker 224 in front of the statement "No. of XML Elements::HEADCOUNT::TIME::MONTHLY" 233 indicates that a comparison of the respective total numbers the first and second plurality XML statements generated in the actual and expected data for this data item agree (they are the same). The first two of the generated actual and expected XML statements (XML Element::1 235 and XML Element::2 237) also have the same, respective matching data values within each of the actual and expected data sets, as denoted by the "check" marker 224 in front of each. However, the "X" marker 220 in front of the third XML statement ("XML Element::3") 239 indicates that in the data value of XML Element 3 in the actual result does not match the data value of XML Element 3 in the expected result set.

In FIG. 3 the title 214 is selected within the results window 202, for example by a user via a graphical user interface (GUI) or other routine. The selection is indicated in the present view by boldface type font of the title 214, though other indicators may be practiced (highlighting, underlying, etc.). This selection invokes an executive summary window 204 that comprises global information for the overall test results, informing the viewer that the current run of this result ("Res1") failed on the first iteration ("Iterations: 1 Failed") without warnings ("0 Warnings"), that there was no passing iteration ("0 Passed"), and indicating numbers of steps that passed, failed or resulted in warnings during the iteration ("Steps: 28 Failed 0 Warnings 7559 Passed"). The third window 206 is a presentment (at 136) of two sheets that are selectable via their respective tabs 207 and 209, one of all of the statement-wise actual XML data generated from the JSON data, and of all of the expected (second) XML statement dynamic array data.

Figure 4:
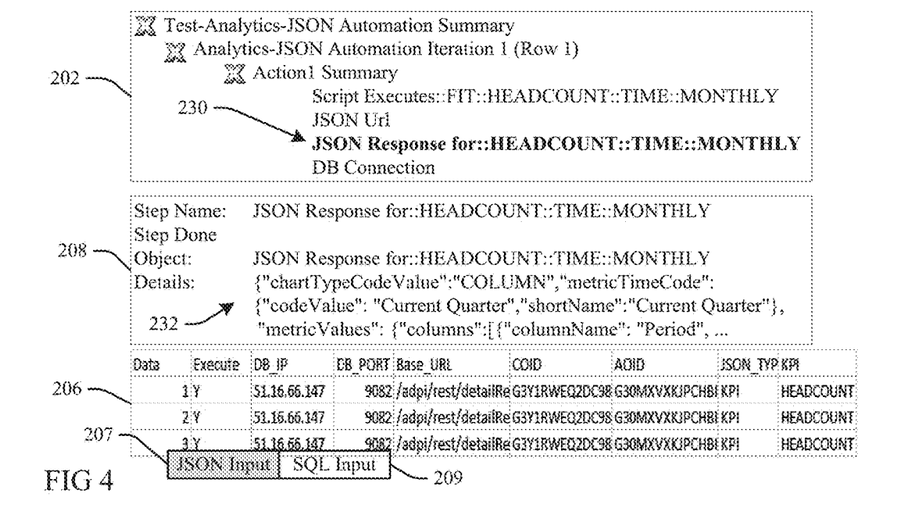
FIG. 4 is another graphic illustration of a presentation of a verification of JSON data according to the present invention.

FIG. 4 is a view wherein a user has selected the JSON response from the back end data 230 within the results window 202, as indicated by the bold face font in this view. (For simplicity of illustration, some of the elements of the results window 202 are omitted from the views of FIGS. 4 through 7). Thus, in response to this selection, a Step summary window 208 is invoked that lists the JSON response 232 generated from the back end data ("{"chartTypeCodeValue": "COLUMN", "metricTimeCode": . . . ") for the selected step 230. The selection of item 230 also causes the sheet of the JSON statement-wise actual XML data of the third window 206 to become selected, as indicated by the highlighting of the JSON Input tab 207 relative to the un-highlighted status of the SQL Input tab 209 in this view, and wherein the actual XML statements generated by the JSON response step 230 are shown in the window 206. Thus, the list of XML statements may automatically advance to the XML statements generated by the step 230. Thus, aspects may refresh and dynamically change the spreadsheet content displayed in the window 206 as a function of relation to items selected within the results window 202.

Figure 5:
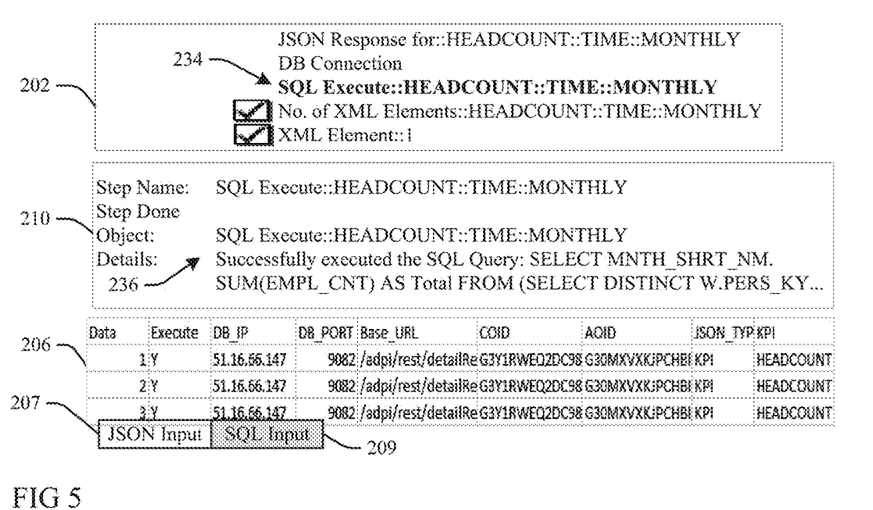
FIG. 5 is another graphic illustration of a presentation of a verification of JSON data according to the present invention.

In FIG. 5 the "SQL Execute::HEADCOUNT::TIME::MONTHLY" step 234 of the results window 202 is selected. This selection invokes a Step summary window 210 for the selected step 234, which provides the SQL query response 236 generated from the back end data ("Successfully executed the SQL query: SELECT MNTH_SHRT_NM.SUM(EMPL_CNT) AS Total FROM (SELECT DISTINCT W.PERS_KY . . . "). The third window 206 is refreshed to show the sheet of the expected XML data generated by the SQL query, as indicated by the highlighting of the SQL Input tab 209 relative to the un-highlighted status of the JSON Input tab 207, and wherein the expected XML statements generated by the SQL query step 234 are shown in the window 206.

Figure 6:
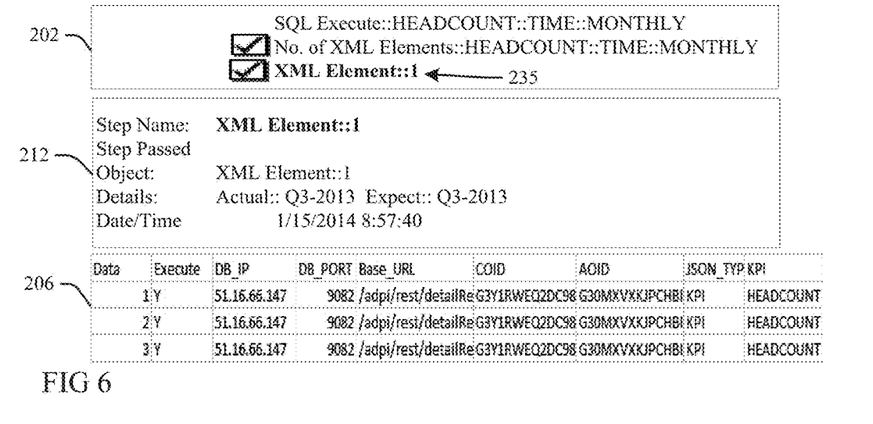
FIG. 6 is another graphic illustration of a presentation of a verification of JSON data according to the present invention.

In FIG. 6 the "XML Element::1" 235 of the results window 202 is selected. This selection invokes a Step summary window 212 for the selected step 235 that indicates if the step passed or failed ("passed"), identifies the object at issue ("XML Element 1") and provides the details of the content compared, wherein here both actual and expected results data have the same data values ("Q3-2013"). The date and time of the comparison is also provided ("1/15/2014 8:57:40"). The third window 206 may default to one of the JSON Input and SQL Input sheets as an active sheet and display at least the XML statement of the XML Element 1 of the active sheet, or it may present both the expected and actual result data statements of the selected XML Element 1 235.

Figure 7:
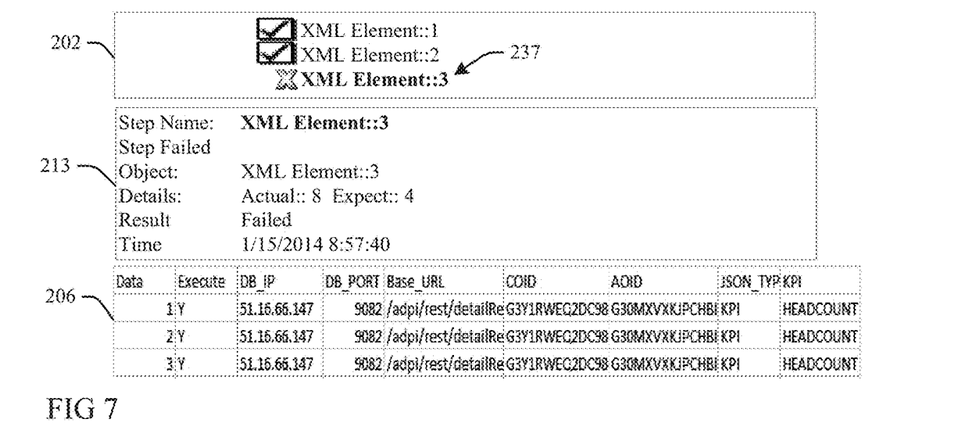
FIG. 7 is another graphic illustration of a presentation of a verification of JSON data according to the present invention.

In FIG. 7 the "XML Element::3" 237 of the results window 202 is selected. This selection invokes a Step summary window 213 for the selected step 237 that indicates that the step has failed, identifies the object at issue ("XML Element 3") and provides the details of the content compared, wherein here the actual data value is "8" but the expected data value is "4." The date and time of the comparison is also provided ("1/15/2014 8:57:40"). The third window 206 may default to one of the JSON Input and SQL Input sheets as an active sheet and display at least the XML statement of the XML Element 3 of the active sheet, or it may present both the expected and actual result data statements of the selected XML Element 3 237

Aspects of the present invention include systems, methods and computer program products that implement the aspects described above. A computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
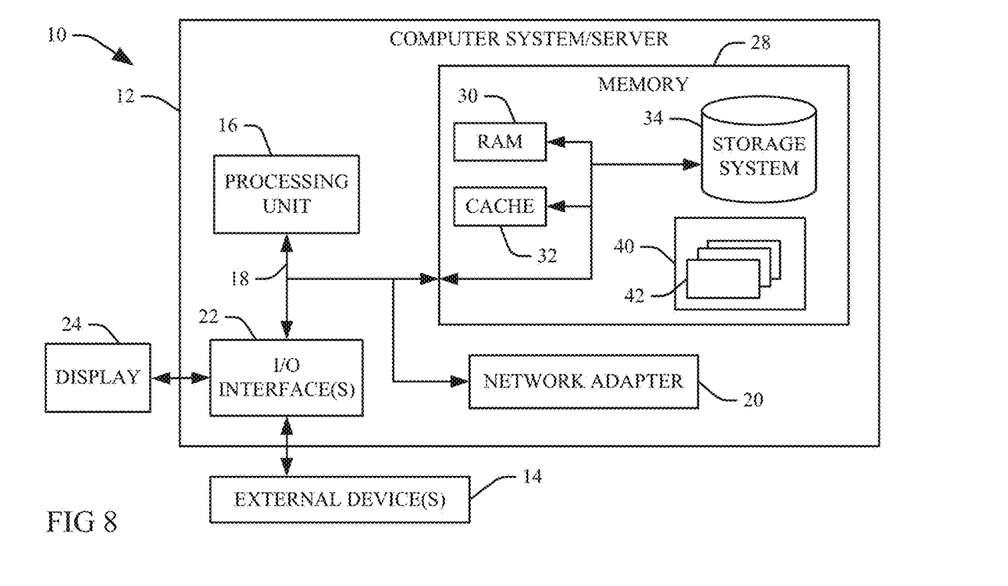
FIG. 8 depicts a computer device according to the present invention.

Referring now to FIG. 8, a computer system (in some instances, a computer server) 12 is operational with numerous other computing system environments or configurations for automatic verification of JSON data according to the present invention. Examples of well-known computing systems, environments, and/or configurations that may be suitable for use with the computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 12 is a programmable device that may be described in the general context of computer system-executable instructions, such as program modules, being executed by a computer system. Generally, program modules may include routines, programs, objects, components, logic, data structures, and so on that perform particular tasks or implement particular abstract data types. The computer system 12 may be practiced in distributed cloud computing environments where tasks are performed by remote processing devices that are linked through a communications network. In a distributed cloud computing environment, program modules may be located in both local and remote computer system storage media including memory storage devices. The components of the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 12 typically includes a variety of computer system readable media. Such media may be any available media that is accessible by the computer system 12, and include both volatile and non-volatile media, removable and non-removable media.

System memory 28 can include computer system readable media in the form of volatile memory, such as random access memory (RAM) 30 and/or cache memory 32. The Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

The computer system 12 may also communicate with one or more external devices 14 such as a keyboard, a pointing device, a display 24, etc.; one or more devices that enable a user to interact with the computer system 12; and/or any devices (e.g., network card, modem, etc.) that enable the computer system 12 to communicate with one or more other computing devices. Such communication can occur via Input/Output (I/O) interfaces 22. Still yet, the computer system 12 can communicate with one or more networks, such as a local area network (LAN), a general wide area network (WAN), and/or a public network (e.g., the Internet) via network adapter 20. As depicted, network adapter 20 communicates with the other components of the computer system 12 via bus 18. It should be understood that although not shown, other hardware and/or software components could be used in conjunction with the computer system 12. Examples include, but are not limited to: microcode, device drivers, redundant processing units, and external disk drive arrays, RAID systems, tape drives, and data archival storage systems, etc.

In one aspect, a service provider may perform process steps of the invention on a subscription, advertising, and/or fee basis. That is, a service provider could offer to integrate computer-readable program code into the computer system 12 to enable the computer system 12 to perform the methods, systems and processes discussed above with respect to FIGS. 1 through 7. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/ or the service provider can receive payment from the sale of advertising content to one or more third parties. Services may include one or more of: (1) installing program code on a computing device, such as the computer device 12, from a tangible computer-readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic verification of JavaScript Object Notation (JSON) data, the method comprising executing on a processor the steps of:
   making a JSON call via an Extensible Markup Language (XML) Hypertext Transfer Protocol (HTTP) HTTP object against a data warehouse data item stored in a back end server;
   converting JSON response data returned from the back end server in response to the JSON call into actual XML result data comprising a first plurality of XML statements;
   executing a Structured Query Language (SQL) query against the data warehouse data item;
   in response to the executed SQL query, generating expected XML result data comprising a second plurality of XML statements;
   comparing data values and total numbers of the actual XML result data first plurality of XML statements to data values and total numbers of the expected XML result data second plurality of XML statements; and
   verifying the JSON response data returned from the back end server in response to matching a total number of the first plurality of XML statements of the actual XML result data to a total number of the second plurality of XML statements of the expected XML result data, and to matching data values of individual ones of the first plurality of XML data statements to data values of corresponding individual ones of the second plurality of XML statements; and wherein the verifying comprises:
   presenting results of the comparing by denoting iteration information, data location information, and a verification marker that is selected from the group consisting of:
   an agreement indicator that indicates that the total number of the first plurality of XML statements matches the total number of the second plurality of XML statements and that the data value of an individual one of the first plurality of XML data statements matches a data value of a corresponding one of the second plurality of XML statements; and
   a mismatch indicator that indicates a discrepancy between the data value of the individual one of the first plurality of XML data statements and the data value of the corresponding one of the second plurality of XML statements and that is indicative of either a data error in the back end or a process error in a front end interface between a user and the back end.

2. The method of claim 1, wherein the step of presenting results of the comparing of the actual XML result data to the expected XML result data comprises denoting:
   whether total numbers of a plurality of subsets of the first plurality of XML data statements that are each generated by converting different JSON script statements match corresponding total numbers of subsets of the second plurality of XML statements that are generated by corresponding SQL query statements; and
   whether data values of each of individual ones of the subsets of the first plurality of XML data statements match data values of corresponding ones of the subsets of the second plurality of XML statements generated for the same corresponding ones of the data warehouse data items.

3. The method of claim 2, further comprising:
   splitting the actual XML result data into actual XML result statement-wise data;
   formatting the actual XML result statement-wise data into a spreadsheet database format; and
   storing the formatted actual XML result statement-wise data into an actual XML result database file; and
   wherein the step of presenting the results of the comparing the stored actual XML result data to the stored expected XML result data comprises presenting the stored formatted actual XML result statement-wise data in a spreadsheet table.

4. The method of claim 3, wherein the step of the presenting the results of the comparing further comprises:
   displaying, in a result window in a graphical user interface display, indications of success or failure of matching the total numbers of the plurality of the subsets of the first plurality of XML data statements generated by converting an associated one of the different JSON script statements to the corresponding total numbers of the subsets of the second plurality of XML statements generated in response to an associated one of the different SQL query statements, and of matching the data values of the individual ones of the subsets of the first plurality of XML statements to the data values of the corresponding ones of the subsets of the second plurality of XML statements.

5. The method of claim 4, wherein the step of the presenting the results of the comparing further comprises, in response to a selection of one of the result window JSON script statements, SQL query statements, the XML statements of the subsets of the first plurality of XML statements or the XML statements of the second plurality of XML statements:
invoking a detail window in the graphical user interface display that provides detail data of the selected one of the JSON script statements, SQL query statements, the XML statements of the subsets of the first plurality of XML statements and the XML statements of the second plurality of XML statements; and
invoking a spreadsheet window in the graphical user interface displays at least one of the XML statements of the subsets of the first plurality of XML statements and the XML statements of the second plurality of XML statements that are relevant to the selected one of the JSON script statements, SQL query statements, the XML statements of the subsets of the first plurality of XML statements and the XML statements of the second plurality of XML statements.

6. The method of claim 5, wherein the step of making the JSON call via the Extensible Markup Language (XML) Hypertext Transfer Protocol (HTTP) HTTP object against the data warehouse data item stored in the back end server comprises:
using a JSON web service to make the JSON call to the back end server; and
using Microsoft XML HTTP to implement the XML HTTP object.

7. The method of claim 6, wherein the step of converting the JSON response data returned from the back end server in response to the JSON call into actual XML result data comprises:
using Newtonsoft.Json.dll to convert the JSON response data returned from the back end server into the first plurality of XML statements.

8. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of making the JSON call against the data warehouse data item stored in the back end server, converting the JSON response data returned from the back end server into the actual XML result data, executing the SQL query against the data warehouse data item, generating the expected XML result data in response to the executed SQL query, comparing the data values and the total numbers of the actual XML result data first plurality of XML statements to data values and total numbers of the expected XML result data second plurality of XML statements, and verifying the JSON response data returned from the back end server in response to matching the total number of the first plurality of XML statements of the actual XML result data to the total number of the second plurality of XML statements of the expected XML result data, and to matching the data values of the individual ones of the first plurality of XML data statements to the data values of the corresponding individual ones of the second plurality of XML statements, by presenting results of the comparing by denoting iteration information, data location information, and the verification marker that is selected from the group consisting of the agreement indicator and the mismatch indicator.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
makes a JSON call via an Extensible Markup Language (XML) Hypertext Transfer Protocol (HTTP) HTTP object against a data warehouse data item stored in a back end server;
converts JSON response data returned from the back end server in response to the JSON call into actual XML result data comprising a first plurality of XML statements;
executes a Structured Query Language (SQL) query against the data warehouse data item;
generates, in response to the executed SQL query, expected XML result data comprising a second plurality of XML statements;
compares data values and total numbers of the actual XML result data first plurality of XML statements to data values and total numbers of the expected XML result data second plurality of XML statements; and
verifies the JSON response data returned from the back end server in response to matching a total number of the first plurality of XML statements of the actual XML result data to a total number of the second plurality of XML statements of the expected XML result data, and to matching data values of individual ones of the first plurality of XML data statements to data values of corresponding individual ones of the second plurality of XML statements, by:
presenting results of the comparing by denoting iteration information, data location information, and a verification marker that is selected from the group consisting of:
an agreement indicator that indicates that the total number of the first plurality of XML statements matches the total number of the second plurality of XML statements and that the data value of an individual one of the first plurality of XML data statements matches a data value of a corresponding one of the second plurality of XML statements; and
a mismatch indicator that indicates a discrepancy between the data value of the individual one of the first plurality of XML data statements and the data value of the corresponding one of the second plurality of XML statements and that is indicative of either a data error in the back end or a process error in a front end interface between a user and the back end.

10. The system of claim 9, wherein the processor executes the program instructions stored on the computer-readable storage medium via the computer readable memory and thereby further presents results of the comparing of the actual XML result data to the expected XML result data by denoting:
whether total numbers of a plurality of subsets of the first plurality of XML data statements that are each generated by converting different JSON script statements match corresponding total numbers of subsets of the second plurality of XML statements that are generated by corresponding SQL query statements; and whether data values of each of individual ones of the subsets of the first plurality of XML data statements match data values of corresponding ones of the subsets of the second plurality of XML statements generated for the same corresponding ones of the data warehouse data items.

11. The system of claim 10, wherein the processor executes the program instructions stored on the computer-readable storage medium via the computer readable memory and thereby further:

splits the actual XML result data into actual XML result statement-wise data;

formats the actual XML result statement-wise data into a spreadsheet database format;

stores the formatted actual XML result statement-wise data into an actual XML result database file; and presents the results of comparing the stored actual XML result data to the stored expected XML result data by presenting the stored formatted actual XML result statement-wise data in a spreadsheet table.

12. The system of claim 11, wherein the processor executes the program instructions stored on the computer-readable storage medium via the computer readable memory and thereby presents the results of the comparing by displaying, in a result window in a graphical user interface display, indications of success or failure of matching the total numbers of the plurality of the subsets of the first plurality of XML data statements generated by converting an associated one of the different JSON script statements to the corresponding total numbers of the subsets of the second plurality of XML statements generated in response to an associated one of the different SQL query statements, and of matching the data values of the individual ones of the subsets of the first plurality of XML statements to the data values of the corresponding ones of the subsets of the second plurality of XML statements.

13. The system of claim 12, wherein the processor executes the program instructions stored on the computer-readable storage medium via the computer readable memory and thereby presents the results of the comparing by, in response to a selection of one of the result window JSON script statements, SQL query statements, the XML statements of the subsets of the first plurality of XML statements or the XML statements of the second plurality of XML statements:

invoking a detail window in the graphical user interface display that provides detail data of the selected one of the JSON script statements, SQL query statements, the XML statements of the subsets of the first plurality of XML statements and the XML statements of the second plurality of XML statements; and invoking a spreadsheet window in the graphical user interface displays at least one of the XML statements of the subsets of the first plurality of XML statements and the XML statements of the second plurality of XML statements that are relevant to the selected one of the JSON script statements, SQL query statements, the XML statements of the subsets of the first plurality of XML statements and the XML statements of the second plurality of XML statements.

14. A computer program product for automatic verification of JavaScript Object Notation (JSON) data, the computer program product comprising:

a computer readable hardware storage device having computer readable program code embodied therewith, wherein the computer readable hardware storage device is not a transitory signal per se, the computer readable program code comprising instructions for execution by a processor that cause the processor to:

make a JSON call via an Extensible Markup Language (XML) Hypertext Transfer Protocol (HTTP) HTTP object against a data warehouse data item stored in a back end server;

convert JSON response data returned from the back end server in response to the JSON call into actual XML result data comprising a first plurality of XML statements;

execute a Structured Query Language (SQL) query against the data warehouse data item;

generate, in response to the executed SQL query, expected XML result data comprising a second plurality of XML statements;

compare data values and total numbers of the actual XML result data first plurality of XML statements to the expected XML result data second plurality of XML statements; and verify the JSON response data returned from the back end server in response to matching a total number of the first plurality of XML statements of the actual XML result data to a total number of the second plurality of XML statements of the expected XML result data, and to matching data values of individual ones of the first plurality of XML data statements to data values of corresponding individual ones of the second plurality of XML statements, by:

presenting results of the comparing by denoting iteration information, data location information, and a verification marker that is selected from the group consisting of:

an agreement indicator that indicates that the total number of the first plurality of XML statements matches the total number of the second plurality of XML statements and that the data value of an individual one of the first plurality of XML data statements matches a data value of a corresponding one of the second plurality of XML statements; and a mismatch indicator that indicates a discrepancy between the data value of the individual one of the first plurality of XML data statements and the data value of the corresponding one of the second plurality of XML statements and that is indicative of either a data error in the back end or a process error in a front end interface between a user and the back end.

15. The computer program product of claim 14, wherein the computer readable program code instructions for execution by the processor further cause the processor to present results of the comparing of the actual XML result data to the expected XML result data by denoting:

whether total numbers of a plurality of subsets of the first plurality of XML data statements that are each generated by converting different JSON script statements match corresponding total numbers of subsets of the second plurality of XML statements that are generated by corresponding SQL query statements; and whether data values of each of individual ones of the subsets of the first plurality of XML data statements match data values of corresponding ones of the subsets of the second plurality of XML statements generated for the same corresponding ones of the data warehouse data items.

16. The computer program product of claim 15, wherein the computer readable program code instructions for execution by the processor further cause the processor to:
- split the actual XML result data into actual XML result statement-wise data;
- format the actual XML result statement-wise data into a spreadsheet database format;
- store the formatted actual XML result statement-wise data into an actual XML result database file; and
- present the results of comparing the stored actual XML result data to the stored expected XML result data by presenting the stored formatted actual XML result statement-wise data in a spreadsheet table.

17. The computer program product of claim 16, wherein the computer readable program code instructions for execution by the processor further cause the processor to present the results of the comparing by displaying, in a result window in a graphical user interface display, indications of success or failure of matching the total numbers of the plurality of the subsets of the first plurality of XML data statements generated by converting an associated one of the different JSON script statements to the corresponding total numbers of the subsets of the second plurality of XML statements generated in response to an associated one of the different SQL query statements, and of matching the data values of the individual ones of the subsets of the first plurality of XML statements to the data values of the corresponding ones of the subsets of the second plurality of XML statements.

* * * * *